March 20, 1962 — H. V. HANCE ET AL — 3,026,514
MOVING TARGET SELECTOR
Filed Dec. 23, 1952 — 2 Sheets-Sheet 1

INVENTOR.
HAROLD V. HANCE,
BY NORMAN H. ENENSTEIN,

Nicholas T Vohr
ATTORNEY.

March 20, 1962 H. V. HANCE ETAL 3,026,514
MOVING TARGET SELECTOR
Filed Dec. 23, 1952 2 Sheets-Sheet 2

INVENTORS,
HAROLD V. HANCE,
BY NORMAN H. ENENSTEIN,
Nicholas T Volk
ATTORNEY.

3,026,514
MOVING TARGET SELECTOR
Harold V. Hance and Norman H. Enenstein, Los Angeles, Calif., assignors, by mesne assignments, to Hughes Aircraft Company, a corporation of Delaware
Filed Dec. 23, 1952, Ser. No. 327,558
10 Claims. (Cl. 343—7.7)

This invention relates generally to pulsed moving target indicating (MTI) radar systems and more particularly to a moving target selector.

Briefly, it is the purpose of a pulsed MTI radar system to indicate visually moving objects or targets in such a manner that they may be distinguished from stationary targets. To accomplish this purpose, a reference signal is conventionally provided which has a fixed phase relation to each exploratory pulse generated by the transmitter of the radar system. This reference signal may be produced locally in the radar system itself, or it may consist of echo pulses from stationary targets. In either case, the operation of a conventional MTI radar system is basically the same.

Thus, each of the exploratory pulses, radiating from the antenna of the radar system, usually illuminates a plurality of targets from which echo pulses are returned. These echo pulses are combined with the reference signal and detected to produce a video pulse. Because successive stationary target echoes have a fixed phase relation to the reference signal, they are represented by individual components of the video pulse which have a fixed amplitude from one video pulse to the next. On the other hand, successive moving target echoes vary in phase with respect to the reference signal. Hence, they may be represented by individual video pulse components which vary in amplitude from pulse to pulse. Consequently, when the video pulses are presented visually, indications of moving targets may be readily distinguished from indications of stationary targets by virtue of their amplitude variations.

It is often desirable, however, to facilitate the recognition of moving targets by cancelling or eliminating those components of each video pulse which are representative of stationary targets. This object is generally accomplished by means of a moving target selector, often referred to as a cancellation system. In a moving target selector, each video pulse is delayed and subtracted from the succeeding video pulse. Consequently, substantially identical or repetitive video pulse components, derived from successive fixed target echoes, are cancelled, whereas video pulse components which vary in amplitude, derived from moving target echoes, are not.

In order to accomplish the necessary delay of the video pulses, a conventional moving target selector is generally provided with an ultrasonic delay line. Such a delay line has frequency characteristics which require that a carrier wave be used for transmitting the video pulses through the delay line. In the past, it has been the practice to generate in the moving target selector, a carrier wave which is amplitude modulated by each succeeding video pulse supplied by the receiver; the amplitude-modulated carrier wave is then transmitted through the delay line. Owing to the attenuation of the carrier wave by the delay line, amplification is also provided so that delayed and undelayed demodulated video pulses are equal in amplitude prior to their subtraction. Video pulse components indicative of fixed targets may then be cancelled because of their identical amplitudes.

As is well known, however, amplification of the modulated carrier wave or of the video pulses cannot be accomplished without some degree of amplitude distortion. In addition, the amplitude of the delayed video pulses may differ from the amplitude of the undelayed video pulses because of random variations in amplifier gain. Either of these effects seriously impairs the operation of a conventional moving target selector by creating differences in amplitude which should not exist, thereby preventing complete cancellation of signal components representative of fixed targets.

According to the present invention, however, the carrier wave to be transmitted through the delay line is angle-modulated rather than amplitude modulated by the video pulses; that is, the carrier wave is either frequency-modulated or phase-modulated. More nearly complete cancellation of the video pulses representative of fixed targets may then be obtained, since the carrier wave amplitude is not representative of the modulation signals and therefore the modulation signals are unaffected by variations in amplifier gain or by amplitude distortion.

Therefore, it is an object of this invention to provide an improved moving target selector which permits more perfect cancellation of successive signals indicative of fixed targets.

It is another object of the invention to provide a moving target selector wherein amplifiers having undesirable variations of gain or having a non-linear response may be used without impairing cancellation of successive signals representative of fixed targets.

It is still another object to provide a moving target selector in which the frequency of a carrier wave is modulated in accordance with signals from a radar receiver for improved moving target selection.

It is a further object to provide a moving target selector having means for modulating the phase of a carrier wave in accordance with signals representative of target echoes for more perfect cancellation of signals representative of fixed targets.

The novel features which are believed to be characteristic of the invention, both as to its organization and method of operation, together with further objects and advantages thereof, will be better understood from the following description considered in connection with the accompanying drawings in which.

Figure 1:
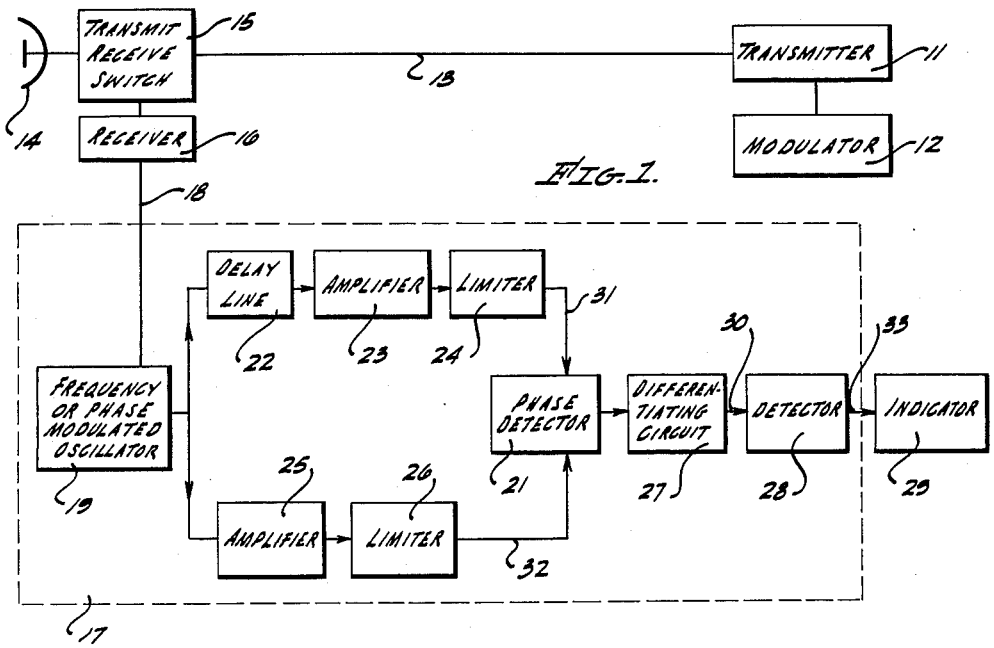
FIG. 1 is a block diagram of one embodiment of the present invention.

Referring now to the drawings wherein like elements are designated by the same reference character, FIG. 1 illustrates a moving target selector according to one embodiment of this invention as used in a conventional radar system. Thus, a transmitter 11 which is controlled by a modulator 12, furnishes periodically recurring pulses of electromagnetic energy to a transmission line or waveguide 13. By means of transmission line 13, this energy is fed to an antenna 14 through a transmit-receive or duplexer switch 15, where it is directionally radiated in the form of electromagnetic waves. During the interval between pulses, transmit-receive switch 15 serves to disconnect transmission line 13 from antenna 14 and to connect antenna 14 to a receiver 16. Accordingly, echo pulses from objects or targets, having been illuminated by the radiant energy from antenna 14, are returned to antenna 14 and applied to the input circuit of receiver 16. These echo pulses are detected by receiver 16 and applied through an output lead 18 to the moving target selector 17 incorporating the present invention.

More specifically, output lead 18 from receiver 16 is connected to a frequency-modulated (FM) oscillator 19, included in moving target selector 17. FM oscillator 19 generates a carrier wave frequency modulated by the detected echo pulses or video pulses applied through output lead 18. This carrier wave traverses two distinct paths or channels both leading to a phase comparator such as phase detector 21.

One of these channels, usually designated as the delayed channel, includes a delay line 22, an amplifier 23, and an amplitude limiter 24, connected in cascade between FM oscillator 19 and a lead 31 connected to phase detector 21. The other channel, usually designated as the undelayed channel, includes an amplifier 25 and an amplitude limiter 26, which are similarly connected to phase detector 21 through a lead 32. The output signals from phase detector 21 are first applied to a differentiating circuit 27, and then impressed on a detector 28 through a connecting lead 30. Finally, an indicator 29, not part of this invention, is coupled to detector 28 by means of a connecting lead 33, thereby providing a visual display of a moving target.

Figure 2:
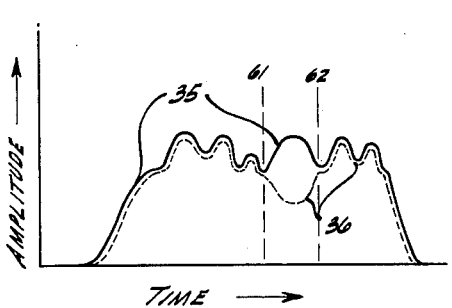
FIG. 2 is a graphical illustration of a pair of video pulses, each derived from a plurality of echo pulses.

FIG. 2 illustrates graphically and in somewhat idealized fashion, the respective amplitudes, as a function of time of two consecutive video pulses that might be derived from receiver 16. Each of these video pulses are representative of echo pulses of an exploratory pulse returned from a plurality of fixed targets and a single moving target. The first video pulse is indicated by a solid line 35, and the second by a dotted line 36. Although these video pulses are superimposed, as shown in FIG. 2, the second video pulse is actually developed later than the first, the time interval between the two being equal to the interpulse period, that is the period between consecutive pulses. Comparing the relative amplitudes of the video pulses, it is seen that the amplitude of the second video pulse is everywhere substantially equal to the amplitude of the first signal except in the segment indicated by vertical lines 61, 62. The solid line 35 and the dotted line 36 outside segment 61, 62 are shown slightly separated to avoid confusion. It follows, therefore, that the video pulse components within the segment between lines 61, 62 are representative of two consecutive moving target echo pulses, whereas the video pulse components outside the segment are derived from a plurality of stationary target echo pulses.

Figure 3:
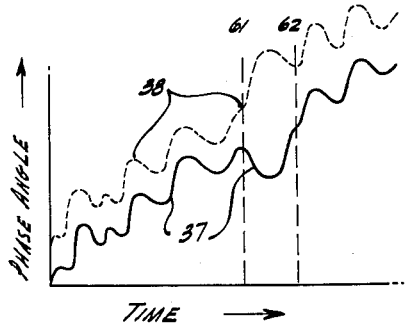
FIGS. 3, 4 and 5, are graphical illustrations of related quantities associated with the signals appearing at certain points of the system of FIG. 1.

Referring now to FIGS. 1 and 3, there is illustrated graphically in FIG. 3, the phase angle as a function of time of the carrier wave generated by FM oscillator 19 in response to the video pulses of FIG. 2. In particular, solid line 37 of FIG. 3 illustrates the phase angle of the FM carrier wave generated in accordance with the first video pulse, and dotted line 38 shows that of the FM carrier wave generated in accordance with the following or second video pulse. Thus, lines 37, 38 actually represent the phases of two distinct portions of the carrier wave, separated in time like the video pulses shown in FIG. 2. For convenience, however, lines 37 and 38 are superimposed as are lines 35, 36 of FIG. 2.

It is the purpose of the delayed channel, and more specifically of the delay line 22, to delay the first portion of the carrier wave, whose phase is represented by solid line 37 of FIG. 3, so that it is impressed on phase detector 21 simultaneously with the second portion, the phase of which is represented by dotted line 38. This purpose is accomplished by equalizing the delay time of the delay line and the time interval between exploratory pulses, that is, the interpulse period. Accordingly, the first portion of the carrier wave traverses the delayed channel and arrives at phase detector 21 in time coincidence with the second portion of the carrier wave applied to phase detector 21 from the undelayed channel.

Since delay line 22 also attenuates the delayed FM carrier wave to an appreciable degree, amplification thereof is provided by amplifier 23. If required, another amplifier 25 may be used in the undelayed channel to make the amplitude of the undelayed FM carrier wave approximately equal to that of the delayed FM carrier wave. Amplitude limiters 24 and 26, following amplifiers 23 and 25, respectively, eliminate any residual amplitude variations that may occur in the delayed and undelayed FM carrier waves. As is well known, however, these limiters are unnecessary if phase detector 21 includes an electron tube, such as a 6BN6, which also serves as an amplitude limiter.

Figure 4:
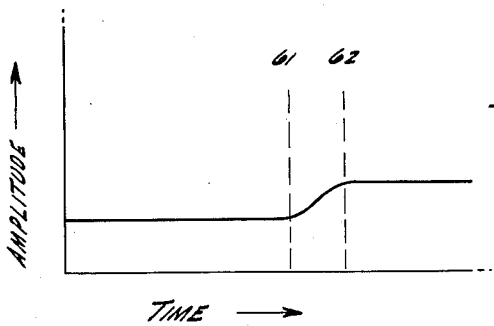

The amplitude with respect to time of the output signal from phase detector 21, resulting from the simultaneous phase comparison of the first and second FM carrier wave portions, is illustrated in FIG. 4. In particular, it may be observed from FIG. 4 that the amplitude of this output signal corresponds to the phase difference of the first and second carrier wave portions 37 and 38 shown in FIG. 3. Since this phase difference changes within segment 61, 62 of FIG. 3, because of the amplitude difference between the video pulses, occurring during that time interval as shown in FIG. 2, a corresponding change occurs in the amplitude of the phase detector output signal as shown within segment 61, 62 of FIG. 4. Therefore, the rate of amplitude change within segment 61, 62 of FIG. 4 is determined by the amount of the amplitude difference within segment 61, 62 of FIG. 2.

Figure 5:
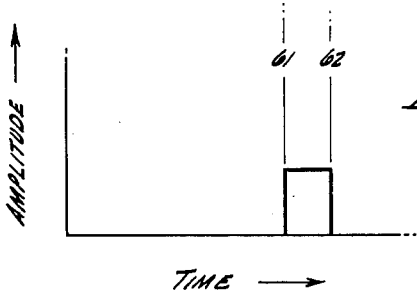

To obtain a more suitable form of signal than the phase detector output signal of FIG. 3, a pulse having an amplitude proportional to the rate of change of the output signal amplitude, is generated by differentiating circuit 27. Since this rate of change is in turn determined by the amplitude difference between the two consecutive video pulse components, the pulse generated by differentiating circuit 27 accurately represents the moving target echoes. Such a pulse is illustrated in FIG. 5. However, owing to the characteristics of most phase detectors, such as those including a 6BN6 for example, a cyclical variation may occur in the portion of the phase detector output signal, shown in segment 61, 62 of FIG. 4. This is because most phase detectors produce the same output signal for any phase difference which is a multiple of $2\pi$ radians greater or less than any given phase difference. In actual practice, therefore, more than one pulse, like the pulse of FIG. 5, may be developed by the differentiating circuit 27. In order to overcome this difficulty, and at the same time provide a direct current signal having a polarity which is independent of the sense of the phase variation, shown in segment 61, 62 of FIG. 3, the detector 28 provides full wave rectification of the pulse or pulses derived from differentiating circuit 27. The differentiated and detected output signal from phase detector 21 may be applied through connecting lead 33 to indicator 29 for visual display of the moving target.

Figure 6:
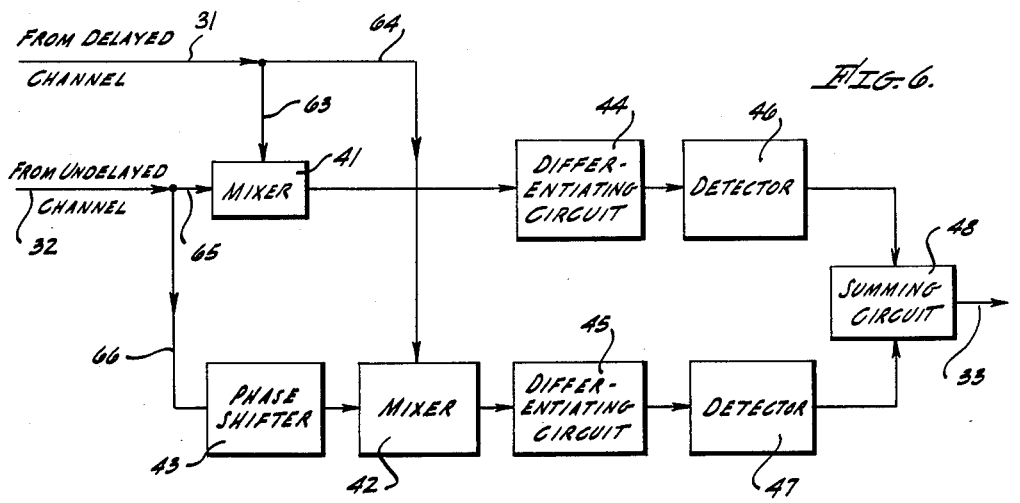
FIG. 6 is a block diagram of another embodiment of this invention.

The operation of the moving target selector according to this embodiment of the present invention has been described so far in terms of two consecutive video pulses, each indicative of a plurality of fixed targets and one moving target. It may be desirable in certain applications, however, to compare simultaneously carrier wave portions modulated in accordance with a selected pair of non-consecutive video pulses. In this embodiment, as in succeeding embodiments, this may be done by altering the relation between delay time provided by the delay line and the interpulse period of the transmitter. In any event, operation with respect to succeeding video pulses representative of these same targets or even different targets, could of course be the same. It follows then, that the signal furnished to indicator 29 recurs in synchronism with succeeding video pulses derived from corresponding exploratory pulses. There is illustrated in FIG. 6 another embodiment of this invention similar in some respects to the embodiment illustrated in FIG. 1. That is to say, the moving target selector of FIG. 6 is the same as that of FIG. 1, except for the portion thereof between connecting leads 31, 32 from the delayed and undelayed channels, respectively, and lead 33 connecting to indicator 29 of FIG. 1.

Referring now to FIG. 6, lead 31 from the delayed channel is connected to a pair of mixers 41, 42 by means of branch leads 63, 64 respectively. Lead 32 is connected to mixer 41 by a branch lead 65, and to a phase shifter 43 by a branch lead 66. Phase shifter 43 is coupled to mixer 42. Mixers 41, 42 are connected, in turn, to separate differentiating circuits 44, 45, respectively. Finally, a pair of square law detectors 46, 47 couple the differentiating circuits 44, 45, respectively, to a common summing circuit 48.

As described in connection with FIG. 1, the pair of video pulses derived from receiver 16, each indicative of a plurality of fixed targets and a single moving target, are transmitted through the delayed and undelayed channels by means of an FM carrier wave. Since leads 31 and 32 are the output leads from the delayed and undelayed channels, respectively, the portions of this FM carrier wave, frequency modulated by the respective video pulses, are simultaneously impressed on mixers 41, 42 by means of these leads. However, phase shifter 43 causes the phase of the undelayed FM carrier wave impressed on mixer 42 to be shifted by 90°. Consequently, the undelayed FM carrier wave portion appearing at mixer 42 is 90° out of phase with respect to the same portion as it appears at mixer 41.

The remainder of the operation may best be described with reference to the following equations wherein:

$S_1$ is the output signal from mixer 41,
$S_2$ is the output signal from mixer 42,
A is a constant representing the amplitude of signals $S_1, S_2$,
$t$ is time,
$\phi$ is a constant phase angle relating the phase of signals $S_1, S_2$ to some arbitrary time,
$w_1$ is the angular frequency of the delayed FM carrier wave, and
$w_2$ is the angular frequency of the undelayed FM carrier wave.

$$S_1(t) = A \sin [(w_1 - w_2)t + \phi] \quad (1)$$

$$S_2(t) = A \cos [(w_1 - w_2)t + \phi] \quad (2)$$

$$\frac{dS_1(t)}{dt} = (w_1 - w_2) A \cos [(w_1 - w_2)t + \phi] \quad (3)$$

$$\frac{dS_2(t)}{dt} = (w_1 - w_2) A \sin [(w_1 - w_2)t + \phi] \quad (4)$$

$$\left[\frac{dS_1(t)}{dt}\right]^2 + \left[\frac{dS_2(t)}{dt}\right]^2 = [A(w_1 - w_2)]^2 \quad (5)$$

Equations 1 and 2 indicate that the resulting output signals $S_1(t)$ and $S_2(t)$ from mixers 41, 42 respectively, are also 90° out of phase. By means of the differentiating circuits 44, 45, these output signals are individually differentiated. Each of the differentiated signals has an amplitude which is proportional to the frequency difference between the delayed and undelayed carrier wave portions, as expressed by Equations 3 and 4. They are then detected by the square law detectors 46, 47, respectively, and added by summing circuit 48. Equation 5 demonstrates that the terms $\cos [(w_1-w_2)t+\phi]$ and $\sin [(w_1-w_2)t+\phi]$ in Equations 3 and 4 are thereby eliminated. In addition, it may be observed that summing circuit 48 produces a resultant signal which is proportional to the square of the delayed and undelayed FM carrier wave frequency difference $(w_1-w_2)$. Since this frequency difference is determined in turn by the delayed and undelayed video pulse amplitude difference, this resultant signal is therefore representative of the moving target video pulse components within segment 61, 62 of FIG. 2, as is apparent from the equations, like operation may be obtained by coupling phase shifter 43 to mixer 41 rather than to mixer 42.

According to still another embodiment of this invention illustrated in FIG. 1, a phase modulated oscillator 19 may be used; and in that case differentiating circuit 27 may be omitted. In operation, a carrier wave modulated in phase rather than frequency by the video pulses supplied by receiver 16 is generated by the phase modulated oscillator 19. The portions of this carrier wave, modulated by the respective video pulses are then fed through the delayed and undelayed channels, and applied simultaneously to phase detector 21. Phase detector 21 produces a signal having an amplitude which is proportional to the difference between the phases of the delayed and undelayed carrier wave portions. Since the relative phases of the carrier wave portions are in turn dependent on the relative amplitudes of the two video pulses, only the video pulse components which differ in amplitude are represented by the output signal from phase detector 21. With reference to FIG. 2, it may be seen that only the video pulse components within segments 61, 62 manifesting the moving target, would be so represented, by the output signal from phase detector 21.

Figure 7:
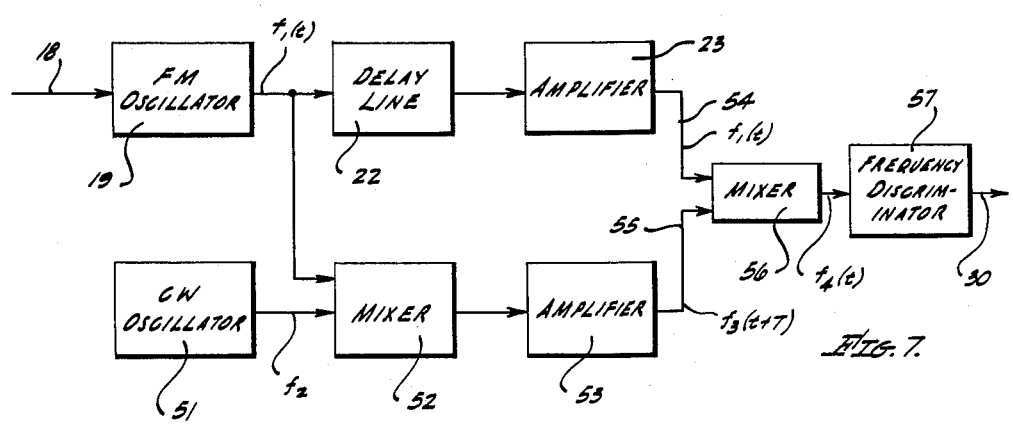
FIG. 7 is a block diagram of still another moving target selector in accordance with the invention.

Referring to FIG. 7, there is illustrated a moving target selector according to a further embodiment of this invention and including the FM oscillator 19 of FIG. 7. As in FIG. 1, oscillator 19 is frequency modulated by the video pulses from receiver 16, which are impressed on FM oscillator 19 through connecting lead 18. The delayed channel, coupled to FM oscillator 19, comprises the delay line 22, and the amplifier 23. The undelayed channel, unlike that of FIG. 1, includes a mixer 52 coupled to both FM oscillator 19 and a continuous wave (CW) oscillator 51. To complete the undelayed channel, an amplifier 53 is coupled to mixer 52. Both delayed and undelayed channels then terminate in a common mixer 56, connected to amplifiers 23 and 53 by means of connecting leads 54, 55 respectively. Finally, there is provided a frequency discriminator 57 coupled to mixer 56. Mixer 56 is preferably of a type suitable for operation as an amplitude limiter also. Alternatively, a separate amplitude limiter may be provided between mixer 56 and frequency discriminator 57. Connecting lead 39 couples frequency discriminator 57 to the detector 28 as illustrated in FIG. 1.

The following equations may be used to describe the operation of the moving target selector of FIG. 7:

$$f_1(t) = f_0 + K e_a(t) \quad (6)$$
$$f_1(t+T) = f_0 + K e_a(t+T) \quad (7)$$
$$f_3(t+T) = f_1(t+T) + f_2 = f_0 + K e_a(t+T) + f_2 \quad (8)$$
$$f_4(t) = f_3(t+T) - f_1(t) = f_2 + K[e_a(t+T) - e_a(t)] \quad (9)$$

where $f_0$ is the center frequency of the FM carrier wave generated by FM oscillator 19,
$f_1$ is the instantaneous frequency of the FM carrier wave generated by FM oscillator 19,
$f_2$ is the frequency of CW oscillator 51,
$f_3$ is the instantaneous frequency of the carrier wave transmitted from amplifier 53,
$f_4$ is the instantaneous frequency of the carrier wave produced by mixer 56,
K is a constant,
$t$ is time,
T is the delay time of the delay line 22, and
$e_a$ is the instantaneous amplitude of the video pulses.

As shown by Equation 6, the frequency, $f_1(t)$, of the FM carrier wave, generated by FM oscillator 19, varies about a nominal or center frequency $f_0$ in accordance with the amplitude of the video pulses applied thereto. It may be assumed, therefore, that Equation 6 refers to the FM carrier wave portion modulated by the first video pulse. The second video pulse arrives at FM oscillator 19, at a time, T, later than the first. Consequently, the FM carrier wave portion generated by FM oscillator 19 is in accordance with the second video pulse which may be represented in frequency by Equation 7.

This latter FM carrier wave portion and the continuous wave generated by CW oscillator 51 are impressed on mixer 52. As a result, mixer 52 produces a complex wave having frequency components equal to multiples of the sum and difference of the respective frequencies $f_1(t+T)$ and $f_2$ of the FM carrier wave and of the continuous wave. However, amplifier 53 may be adapted to pass only the frequency component equal to the simple sum of these frequencies, $f_3(t+T)$ as shown by Equation 8. In effect, therefore, an FM carrier wave portion having a higher center frequency is impressed on mixer 56 from the undelayed channel.

Since the FM carrier wave portion modulated in accordance with the first video pulse and having a frequency given by Equation 6 is impressed on mixer 56 from the delayed channel, both carrier wave portions arrive at mixer 56 simultaneously. Mixer 56, in turn, produces a resultant carrier wave which varies about a center frequency, $f_2$, according to the frequency difference $[f_1(t)-f_3(t+T)]$, as indicated by $f_4(t)$ in Equation 9. This frequency difference is proportional to the amplitude difference $[e_a(t+T)-e_a(t)]$, between the video pulses as also shown by Equation 9.

Frequency discriminator 57 then converts the frequency variations of the carrier wave produced by mixer 56 to amplitude variations. Consequently, the signal derived from frequency discriminator 57, and furnished to detector 38 is representative of the moving target video pulse components within segment 61, 62 of FIG. 2, since only these components differ in amplitude. As described in connection with FIG. 1, detector 28 provides full wave rectification of this signal so that its polarity remains the same irrespective of the sense of the video pulse amplitude difference $[e_a(t+T)-e_a(t)]$.

It will be apparent to those skilled in the art that such operation as described in connection with FIG. 7, is basically dependent on the simultaneous mixing, by mixer 56, of two carrier waves having different center frequencies both being modulated in accordance with each pair of consecutive video pulses. For this reason, several obvious modifications of this embodiment suggest themselves and are hereinafter referred to by way of illustration. Thus, the carrier wave generated by FM oscillator 19 may be impressed substantially directly on mixer 56, and the carrier wave derived from mixer 52 impressed on mixer 56 through the delayed channel by connecting the output of mixer 52 to delay line 22. According to another modification, a carrier wave may be derived from mixer 52 which has a frequency equal to the difference rather than the sum of the frequencies $f_1$ and $f_2$. In this case, the sum of the delayed and undelayed carrier waves could be derived from mixer 56. According to still another modification, mixer 52 and CW oscillator 51 might be replaced with some other means such as a separate FM oscillator developing one of the carrier waves impressed on mixer 56.

Finally, as is well known, a moving object selector for comparing simultaneously more than one pair of consecutive video pulses may be constructed by effectively cascading a pair of moving object selectors in accordance with the invention. (A pair of moving object selectors according to the embodiment of FIG. 7 could be most readily combined in this manner.)

We claim:

1. In a pulsed radar object locating system wherein video pulses are derived from object echo pulses, said video pulses including video pulse components of substantially constant amplitudes from pulse to pulse derived from fixed object echo pulses and video pulse components of varying amplitudes from pulse to pulse derived from moving object echo pulses, a cancellation system for substantially eliminating video pulse components representative of fixed objects comprising: an oscillator; angle modulating control means, said control means being coupled to said oscillator, said control means being adapted to respond to said video pulses to angle modulate said oscillator during the occurrence of said video pulses and in accordance with variations in amplitude of said video pulses; a delay circuit, said delay circuit being coupled to said oscillator, said delay circuit being adapted to delay signals from said oscillator substantially by the period between successive video pulses; and angle modulation comparing means, said comparing means being coupled to said oscillator and to said delay circuit, said comparing means being operative to develop demodulated output signals representative of the difference in angle modulation between successive signals from said oscillator.

2. A moving target indicator according to claim 1 wherein said modulation control means is adapted to phase modulate said oscillator; and said comparing means is adapted to include a phase comparator, and a detector, the input terminal of said detector being coupled to the output of said comparator.

3. In a pulsed radar object locating system wherein video pulses are derived from object echo pulses, said video pulses including video pulse components of substantially constant amplitudes from pulse to pulse derived from fixed object echo pulses and video pulse components of varying amplitudes from pulse to pulse derived from moving object echo pulses, a moving object selector for producing a signal representative of substantially only video pulse components derived from moving object echo pulses comprising: first and second oscillators, said oscillators having different center frequencies; a first and a second frequency modulating control means; a delay circuit with delay time substantially equal to the radar transmitter interpulse period; a frequency mixer having first and second input terminals and an output terminal; and a frequency discriminator, said first control means being coupled to said first oscillator, said second control means being coupled to said second oscillator, said first and second control means having a common input and being adapted to respond to said video pulses to frequency modulate said first and second oscillators respectively during the occurrence of said video pulses and in accordance with variation in amplitude of said video pulses, said first oscillator being coupled to said delay circuit, said delay circuit being coupled to said first input terminal of the mixer, said second oscillator being coupled to said second input terminal of the mixer, and said output terminal of the mixer being coupled to said frequency discriminator, said discriminator being effective to develop demodulated output signals representative of the difference in frequency modulation between successive target video signals.

4. In a pulsed radar object locating system wherein video pulses are derived from object echo pulses, said video pulses including video pulse components of substantially constant amplitudes from pulse to pulse derived from fixed object echo pulses and video pulse components of varying amplitudes from pulse to pulse derived from moving object echo pulses, a cancellation system for substantially eliminating video pulse components representative of fixed objects comprising: an oscillator; frequency modulating control means; a delay circuit with delay time substantially equal to the radar transmitter interpulse period; first and second frequency mixers; first and second differentiating circuits; first and second square law detectors; a summing circuit; and a 90° phase shifter, said frequency modulating control means being coupled to said first oscillator and being adapted to respond to said video pulses to frequency modulate said oscillator during the occurrence of said video pulses in accordance with variations in amplitude of said video pulses, said oscillator being coupled to said delay circuit, said oscillator also being coupled to said first mixer and to said phase shifter, said delay circuit being coupled to said first and second mixers, said phase shifter being coupled to said second mixer, said first and second mixers being respectively coupled to said first and second differentiating circuits, said first and second differentiating circuits being coupled respectively to said first and second square law detectors, said first and second square law detectors being coupled respectively to said first and second input terminals of said summing circuit to develop demodulated output signals representative of the difference in frequency modulation between successive signals from said oscillator.

5. In a pulsed radar object locating system wherein video pulses are derived from object echo pulses, said video pulses including video pulse components of substantially constant amplitudes from pulse to pulse derived from fixed object echo pulses and video pulse components of varying amplitudes from pulse to pulse derived from moving object echo pulses, a cancellation system for substantially eliminating video pulse components representative of fixed object comprising: first and second oscillators having different center frequencies; a frequency modulating control means; a delay circuit with delay time substantially equal to the radar transmitter interpulse period; first and second frequency mixers, and a frequency discriminator, said control means being coupled to said first oscillator and being adapted to respond to said video pulses to frequency modulate said first oscillator during the occurrence of said video pulses in accordance with variations in amplitude of said video pulses, said first oscillator being coupled to said delay circuit and to said first mixer, said second oscillator being a continuous oscillator and coupled to said first mixer, said first mixer being coupled to said second mixer, said delay circuit being coupled to said first input terminal of said second mixer, and said second mixer being coupled to said frequency discriminator to develop demodulated output signals representative of the difference in frequency modulation between successive target video signals.

6. In a pulsed radar object locating system wherein video pulses are derived from object echo pulses, said video pulses including video pulse components of substantially constant amplitudes from pulse to pulse derived from fixed object echo pulses and video pulse components of varying amplitudes from pulse to pulse derived from moving object echo pulses, a moving object selector for producing a signal representative of substantially only video pulse components derived from moving object echo pulses comprising: an oscillator; angle modulating control means, said control means being coupled to said oscillator, said control means being adapted to respond to said video pulses to angle modulate said oscillator during the occurrence of said video pulses and in accordance with variations in amplitude of said video pulses; a delay circuit, said delay circuit having input and output terminals, said input terminal being connected to said oscillator, said delay circuit being adapted to delay signals from said oscillator by substantially the period between successive exploratory radar pulses; and an angle modulation cancellation means having first and second input terminals, said first input terminal being coupled to said oscillator, said second terminal being connected to said output terminal of said delay circuit, said cancellation means being operative to develop demodulated output signals representative of the difference in angle modulation between successive signals from said oscillator.

7. A moving target selector according to claim 6, wherein said angle modulating control means effects frequency modulation of said oscillator.

8. A moving object selector according to claim 7 wherein said angle modulating control means includes a differentiating circuit for differentiating said resultant signal.

9. A moving object selector according to claim 8 wherein said angle modulating control means includes a detector coupled to said differentiating circuit for detecting the differentiated signal so that the polarity of said signal is independent of the sense of phase differences between said carrier wave portions.

10. A moving object selector according to claim 7 including first and second amplitude limiters, said first amplitude limiter being coupled between said first input terminal of the cancellation means and said oscillator, and said second amplitude limiter being coupled between said second input terminal of the cancellation means and the output terminal of said delay circuit.

References Cited in the file of this patent

UNITED STATES PATENTS

| | | |
|---|---|---|
| 2,479,568 | Hansen | Aug. 23, 1949 |
| 2,532,546 | Forbes | Dec. 5, 1950 |
| 2,650,357 | Munster | Aug. 23, 1953 |